United States Patent [19]

Hsu

[11] Patent Number: 4,679,197
[45] Date of Patent: Jul. 7, 1987

[54] GYRO FREE ELECTRON LASER

[75] Inventor: Jang-Yu Hsu, Solana Beach, Calif.

[73] Assignee: GA Technologies Inc., San Diego, Calif.

[21] Appl. No.: 711,237

[22] Filed: Mar. 13, 1985

[51] Int. Cl.[4] .............................................. H01S 3/00
[52] U.S. Cl. ......................................... 372/2; 315/4; 315/5
[58] Field of Search ........................... 372/2; 315/4, 5

[56] References Cited

U.S. PATENT DOCUMENTS

| | | | |
|---|---|---|---|
| 3,457,450 | 8/1966 | Feinstein et al. | 315/5 |
| 3,822,410 | 7/1974 | Madey | 331/94 |
| 4,225,806 | 9/1980 | Le Gardeur | 315/5 |
| 4,283,687 | 8/1981 | Madey et al. | 331/95.5 |
| 4,287,488 | 9/1981 | Brau et al. | 331/94.5 |
| 4,331,936 | 5/1982 | Schlesinger et al. | 372/2 |
| 4,345,329 | 8/1982 | Doucet et al. | 372/2 |
| 4,370,621 | 1/1983 | Sprangle et al. | 330/4 |
| 4,392,078 | 7/1983 | Noble et al. | 315/4 |
| 4,491,765 | 1/1985 | Manheimer et al. | 315/4 |
| 4,550,271 | 10/1985 | Lau et al. | 372/2 |
| 4,554,484 | 11/1985 | Read et al. | 372/2 |

OTHER PUBLICATIONS

Hafizi et al, "Profile of a Relativistic Electron Beam Propagated Through a Linear Wiggler and an Axial Waveguide", Phys. Rev. A, vol. 31, No. 5, May '85, p. 3247.
Godlove et al, "Relativistic Electron Beam Sources of Electromagnetic Radiation", Conf: Proceed. of the Soc. of Photo-Optical Instrum. Eng., Reston, Va. (18-21 Apr. 1977) SPIE, vol. 105 for Infrared/Submill Wave, pp. 17-21, (1977).
M. Friedman et al., "Emission of Coherent Microwave Radiation from a Relativistic Electron Beam Propagating in a Spatially Modulated Field", Jul. 3, 1972, Physical Review Letters, vol. 29, No. 1, pp. 55-58.
J. L. Hirshfield et al., "Electron Cyclotron Maser*", May 11, 1964, Physical Review Letters, vol. 12-No. 19, pp. 533-536.
J. M. Green, "An Assessment of Free-Electron Lasers", Feb. 1981, Optics and Laser Technology, vol. CLM-P 635.
"Free Elections Make Powerful New Laser", Perspectives, High Technology, February 1983, pp. 69 & 70.
P. Sprangle et al., "Enhanced Gain of a Free-Electron Laser", May 1978, Physical Review A, vol. 17, No. 5, pp. 1792 & 1793.
M. Zales Caponi et al., "Optimized Operation of a Free-Electron Laser, Spanning the Single Particle and Collective Regimes: Theory and Experiment*", Dec. 1978, TRW IR&D FEL Report, pp. 523-553.
D. B. McDermott et al., "Small-Signal Theory of a Large-Orbit Electron-Cyclotron Harmonic Maser", Jul. 1983, Am. Inst. Physics, vol. 26, No. 7, pp. 1936 & 1937.

Primary Examiner—Leon Scott, Jr.
Attorney, Agent, or Firm—Fitch, Even, Tabin & Flannery

[57] ABSTRACT

A source of coherent radiation. The source includes an evacuated drift tube having an input end for receiving a bem of relativistic electrons and an output end for providing coherent radiation. A relativistic electron supply provides the beam of electrons to the drift tube input end, and a magnetic field is provided for causing the relativistic electrons to spiral. An azimuthal wiggler causes the spiraling electrons to undergo accelerations while an axial magnetic field is provided for controlling the gyroradii of the spiraling electrons acted upon by the wiggler.

6 Claims, 7 Drawing Figures

GYRO FREE ELECTRON LASER

The present invention relates to sources of coherent radiation and, more specifically, to an improved free electron laser incorporating components of a gyrotron for generating radiation in the infrared, visible light, and ultraviolet frequency range (ultrashort radiation).

BACKGROUND OF THE INVENTION

The free electron laser represents an improvement in the field of high power coherent radiation sources. In this device a beam of relativistic electrons is caused to pass through a static periodic magnetic field with resultant amplification of a superimposed coherent optical input. The electrons in the beam are accelerated and decelerated and the laser action is thought to result from stimulated Compton backscattering of the virtual photons in the periodic magnet, or stimulated magnetic bremsstahlung. Unlike atomic lasers which provide a coherent light output at only a single frequency related to the energy levels of electrons in the atom, free electron lasers are continuously tunable within a range by varying the energy of the beam of electrons and/or by changes in the parameters of the periodic magnetic field. For more information regarding the operation and structure of such a free electron laser, reference may be made to U.S. Pat. No. 3,822,410. In prior art free electron lasers, the static periodic (wiggler) field varies in the axial direction of the drift tube used to provide an evacuated Faraday cage cavity for the electron beam. Difficulty has been experienced in achieving an ultrashort wavelength radiation output because of the relatively fast decay of the high multipole fields provided by the wiggler.

A gyrotron is a form of microwave generator based upon the cyclotron maser interaction beteween an electromagnetic wave and a beam of relativistic electrons in which the individual electrons move along helical paths in the presence of the applied magnetic field. Cyclotron resonance coupling offers the advantage that both the electron beam and the microwave structures can have dimensions which are large compared to the output wavelength. One of the primary uses for a high power gyrotron is considered to be for fusion ignition in fusion research experimentation. For further information regarding the operation of a gyrotron, reference may be made to U.S. Pat. No. 3,398,376, "Electron Cyclotron Maser", Hirshfield and Wachtel, *Physical Review Letters*, Vol. 12, No. 19, May 1964, pages 533–536, and Hirchfield, J. L., et al., "The Electron Cyclotron Maser—An Historical Survey," *IEEE Transactions on Microware Theory and Techniques*, Vol. MTT-25, No. 6, June 1977, pp. 522–527.

There is a need for a coherent radiation source capable of providing an output in the infrared, visible and ultraviolet range. Potential uses include those of conventional atomic lasers such as communications, diagnostics, photochemistry (selective chemical reaction, isotope separation and very large scale integrated circuitry manufacture) and biomedical research.

SUMMARY OF THE INVENTION

Among the several aspects of the present invention may be noted the provision of an improved source of coherent radiation in the infrared, visible and ultraviolet range which combines individual advantages of conventional gyrotrons and conventional free electron lasers while avoiding their respective individual shortcomings. The source causes a large cyclotron orbit to be imposed with a high harmonic azimuthal wiggler field which results in active selection of the specific harmonic cyclotron wave. The source also provides an axial magnetic field to control the closeness of the spiraling electrons to the multipole wiggler field by adjusting their gyroradii. The source of coherent radiation of the present invention provides much greater operating efficiency than conventional free electron lasers. Other aspects and features of the present invention will be, in part, apparent and, in part, pointed out hereafter in the following specification and accompanying claims and drawings.

Briefly, the source of coherent radiation of the present invention includes a drift tube having an input end and an output end with a relativistic electron supply providing a beam of relativistic electrons to the tube input end. A magnet acts upon these electrons to cause them to spiral while an azimuthal wiggler causes the spiraling electrons to undergo acceleration and deceleration. Another magnet supplies an axial magnetic field for controlling the gyroradii of the spiraling electrons acted upon by the wiggler.

BRIEF DESCRIPTION OF THE DRAWINGS

Corresponding reference characters indicate corresponding components throughout the several views of the drawings.

DESCRIPTION OF THE PREFERRED EMBODIMENTS

Figure 2:
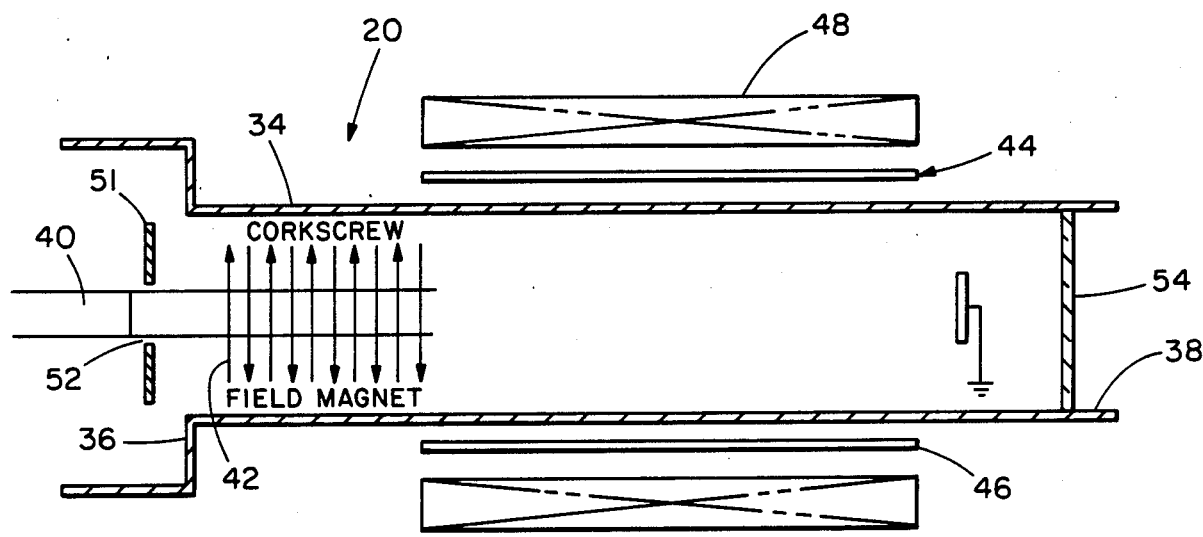
FIG. 2 is a partly diagrammatic axial sectional view of the coherent radiation source of the present invention configured as an oscillator.

Referring now to the drawings, one preferred embodiment of an improved coherent radiation source of the present invention is indicated generally at reference numeral 20 in FIG. 2. The source 20, which employs features of a conventional free electron laser and of a conventional gyrotron, can generate ultrashort wavelength radiation in the infrared, visible and ultraviolet frequency range.

Figure 1:
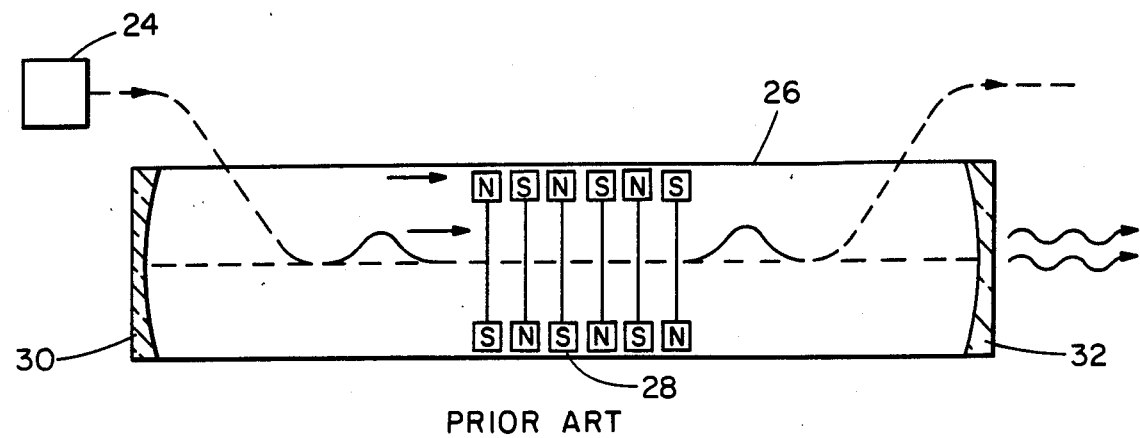
FIG. 1 is a diagrammatic view of components of a prior art free electron laser.

A prior art free electron laser, shown diagrammatically in FIG. 1, includes a generator 24 of relativistic electrons providing an electron beam into a drift tube 26. As the electrons move through the tube, they are acted upon by a wiggler or periodic magnet 28 which provides a magnetic field varying in the axial direction of the tube. The wiggler causes bends in the movement of the electrons. Each bend is an acceleration resulting in the charged particle emitting photons. A totally reflective mirror 30 is disposed at the input end of the drift tube and a partially reflective mirror 32 is positioned at the tube output end. The mirrors establish a resonant cavity to store coherent radiation and, after a threshold intensity is achieved, the partially transmitting mirror 32 allows the coherent radiation to provide an output.

Figure 6:
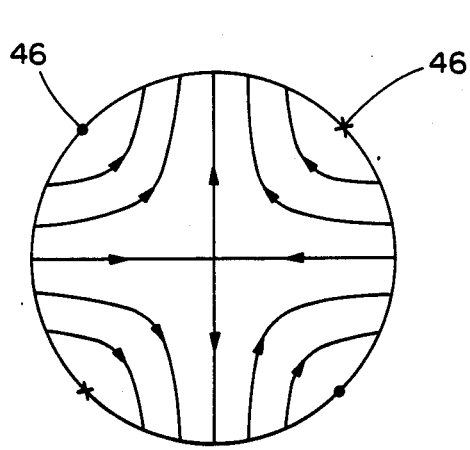
FIG. 6 is an illustration of the contours of magnetic flux provided by the current rods when four are employed.
Figure 7:
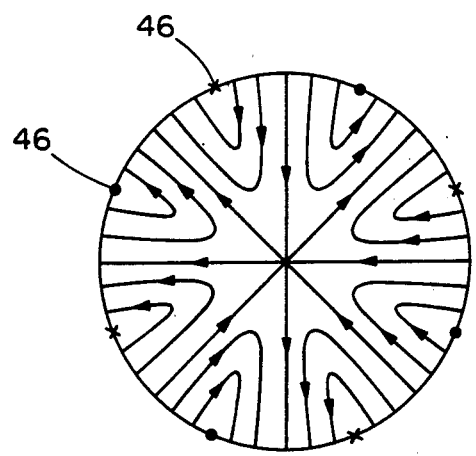
FIG. 7, similar to FIG. 6, shows the contours of magnetic flux provided by the current rods when eight are used.

Referring to FIG. 2, one preferred embodiment of the coherent radiation source of the present invention includes an evacuated drift tube 34. The tube 34 has an input end 36 for receiving a beam of relativistic electrons, and an output end 38 for providing the coherent radiation output. A source 40 providing the beam of relativistic electrons in positioned adjacent the tube input end 36. The beam from the source passes though a magnet 42 providing a twisted transverse magnetic field, called a corkscrew, which causes the electrons in the beam to spiral. Alternatively, the source 40 could be positioned to cause the electron beam to enter the drift tube at an angle and the presence of an axial magnetic field would cause the electrons to spiral. The coherent radiation source 20 further includes an azimuthal wiggler 44 positioned between the magnet 42 and the output drift tube end 38 for causing the spriraling electrons to undergo acceleration and deceleration in directions generally parallel to the axis of the drift tube 34. The wiggler 44 comprises an even-numbered plurality of regularly spaced current rods 46 disposed outside the drift tube and about its periphery. Each rod 46 extends substantially parallel to the axis of the tube 34. Adjacent rods carry direct current in opposite directions. The magnetic field pattern resulting from the use of four rods is shown in FIG. 6, while FIG. 7 illustrates the magnetic field pattern when eight current rods are used.

Figure 4:
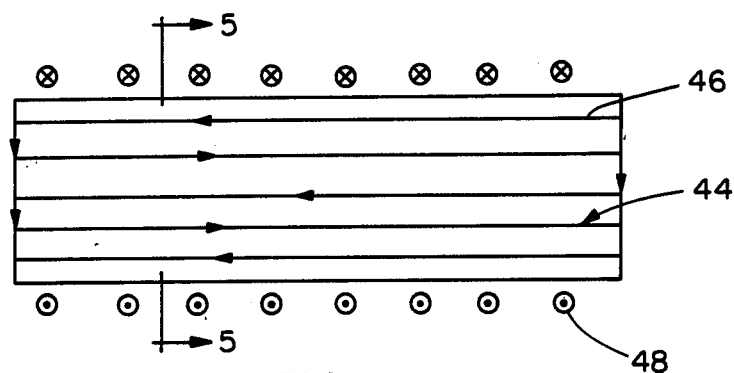
FIG. 4 is an axial sectional view, diagrammatic in nature, of a solenoid winding and current rods used in the coherent radiation source of the present invention.
Figure 5:
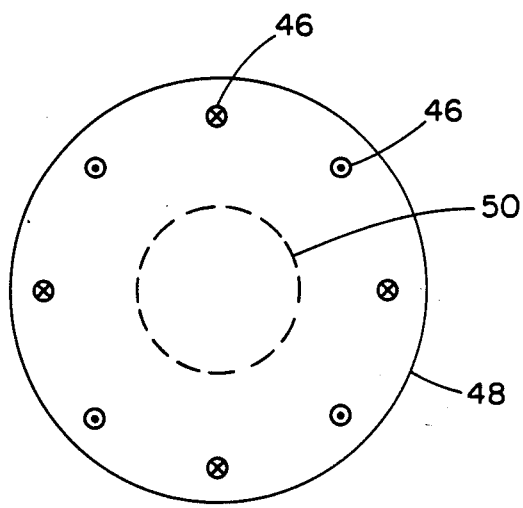
FIG. 5 is a transverse sectional view of the solenoid winding and the current rods of FIG. 4 taken along line 5—5 of FIG. 4.

The use of the wiggler 44 causes a high harmonic to be imposed on the large cyclotron orbit of the electrons provided by magnet 42. To control the gyroradii of the spiraling electrons acted upon by the wiggler field, a solenoid 48 is employed between the corkscrew magnet 42 and the drift tube output end 34. The solenoid provides an axial magnetic field and it is preferably positioned outside and wound coaxially with the drift tube. The current rods 46 are preferably positioned between the solenoid and the drift tube. The rods and the solenoid are best shown in FIGS. 4 and 5. Thus the charged particles (electrons) are caused to move within a cylindrical surface centered on the drift tube axis with the wiggler field causing the electrons to accelerate in directions generally parallel to the drift tube axis.

The presence of the wiggler causes the selection of the specific harmonic cyclotron wave, which has an equivalent input frequency of:

$$\omega_i = N\Omega_c$$

where

N is an integer determined by the number of current rods $\Omega_c = eB/\gamma m =$ the electron cyclotron frequency.

where e = electron charge
B = d c magnetic field
$\gamma$ = relativistic mass factor
m = rest mass.

This high harmonic cyclotron wave is scattered off the relativistic electrons to provide an output wave at a frequency of:

$$\omega_o = 2\gamma^2\omega_i = 2\gamma N\Omega_c$$

Assuming the axial magnetic field strength, Bo, is about 10 kG, $V_\perp \sim c$ (where $V_\perp$ is the electron velocity perpendicular to the drift tube axis and c is the speed of light), and $\gamma \sim 2$, then the gyroradii $\rho_e \sim 0.5$ cm and the circumference of the source 20 is about 3 cm. If four current rods 46 are employed, N equals 2 and the generated radiation frequency is 240 GHz. While both the axial field solenoid 48 and the current rods 46 can be fabricated using normal conductors, if the solenoid and rods are formed using superconductors, high multipoles can be constructed. With $\gamma \sim 10$-100 and $N \sim 10$-100, coherent output radiation at wavelengths of $5 \times 10^{-4}$ cm (infrared) to $5 \times 10^{-6}$ cm (ultraviolet) can be generated.

More specifically, the wiggler fields $\vec{B}_w$ provided by the current in rods 46 given by $$\vec{j}_w = \sum_{n=1}^{2N-1} (-1)^n j_o \delta(r-r_o) \delta\left(\theta - \frac{n\pi}{2N}\right) \hat{e}_z$$

where
 $j_o$ is the current density,
 $j\delta()$ is the Dirac delta function, and
 $\hat{e}_z$ is the unit vector along the axial direction
are schematically plotted for N=2 and N=4 in FIGS. 6 and 7. A more convenient current distribution $\vec{j}_w = j\delta(r-r_o)\cos N\theta \hat{e}_z$ is used in the following, which gives the vector potential $$\vec{A}_w = \frac{2\pi r_o}{Nc} j_o \cos N s \left[ \begin{array}{l} \left(\frac{r}{r_o}\right)^N \\ \left(\frac{r_o}{r}\right)^N \end{array} \right] \hat{e}_z, \quad \begin{array}{l} r < r_o \\ \\ r > r_o \end{array} \quad (1)$$

The wiggler magnetic field of interest is the $\hat{e}_r$ component $$B_{wT} = \frac{2\pi}{c} j_o \sin N\theta \left(\frac{r}{r_o}\right)^{N-1} \quad (2)$$

The equation of motion in the combined axial and wiggler fields, $\vec{B} = B_o\hat{e}_z + B_w$ is $$\frac{d\gamma\vec{v}}{dt} = \vec{v} \times \vec{\Omega}_o + \vec{v} \times \vec{\Omega}_w. \quad (3)$$

In cylindrical coordinates, $\vec{v} = v_z\hat{e}_z + v_\theta\hat{e}_\theta - v_r\hat{e}_r$, where $v_\theta = r\dot\theta$, $v_r = \dot{r}$, and $v_z = \dot{z}$ with $v_\theta >> v_z >> v_r$, $\Omega_o >> \Omega_w$. The dot overhead denotes the time derivative, and $\hat{e}_r$ is the unit vector along the radial direction while $\hat{e}_\theta$ is the unit vector along the azimuthal direction. Note that r is the electron gyroradius 50 shown in FIG. 5. To lowest order, the particles (electrons) execute cyclotron motion $\dot\theta = \omega_o/\gamma$, $v_\theta = r\omega_o/\gamma \approx c[1-(\frac{1}{2}\gamma^2)]$, and $v_z = v_{zo}$. To next order $$\frac{d\gamma v_z^{(1)}}{dt} = -\frac{r\Omega_o}{\gamma} \dot{\Omega}_{wr} = -\frac{r\Omega_o}{\gamma} \tilde{\Omega}_w(r) \sin N\theta \quad (4)$$

$$\frac{d\gamma v_r^{(1)}}{dt} = 3v_\theta^{(1)}\Omega_o - v_{zo}\Omega_{w\theta},$$

$$\frac{d\gamma v_\theta^{(1)}}{dt} = -2v_r^{(1)}\Omega_o + v_{zo}\Omega_{wr}.$$

The dominant first order velocity is $v_z^{(1)}$, since $\omega_o >> \omega_w$ and $v_{zo} << r_o$, which is $$v_z^{(1)} = \frac{r\tilde{\Omega}_w(r)}{\gamma N} \cos N\theta, \quad (5)$$

where $\omega_w(r) = (2\pi e/m_e c^2) r_o j_o (r/r_o)^{N-1}$. This velocity component can resonate with a TM mode, which has an electric field in the $\hat{e}_z$ direction $$E_z = EJ_m(k_l r) \cos(k_z z) \cos(m\theta - \omega t), \quad (6)$$

where $\tilde{\Omega}_2 = k^2 c^2 = k_l^2 c^2 + c^2 n^2 \pi^2 / L^2$, with L the length of the drift tube 34. The conducting wall boundary condition requires $J_m(k_l r_o) = 0$ where $J_m$ is the Bessel function of order m. Considering a TM mode near cutoff in the $\hat{e}_z$ direction, or $k_l L >> 1$, one has $\Omega = k_l c = (c/r_o) \times (m + 1.86\ m^{\frac{1}{3}} + \dots)$.

Energy is extracted from the particles (electrons) through $$m_e c^2 \frac{d\gamma}{dt} = \langle eE_z v_z^{(1)} \rangle = \frac{er\tilde{\Omega}_w(r)}{2N\gamma} \cos[(m + \quad (7)$$

$$N)\theta - \omega t]J_m(K_2\gamma),$$

where the bracket means an average over the cyclotron period. Resonance occurs when $$(m+N)\dot{\theta} = \omega = (m+N)\frac{c}{r}\left(1 - \frac{1 + \frac{K^2}{2}}{2\gamma^2}\right) = \frac{\pi c}{r}. \quad (8)$$

This leads to $m \doteq 2N\gamma^2/(1+K^2/2)$ where $K = \tilde{\Omega}_w r / Nc^2$ is the wiggler parameter. Therefore, $\omega \approx m\Omega = 2\gamma N\Omega_o$. Defining the phase angle $\Phi = (m+N)\theta - \omega t$, $$m_e c^2 \frac{d\gamma}{dt} = \frac{er\tilde{\Omega}_w(r)}{2N\gamma} E J_m(k_l r) \sin\phi, \quad (9a)$$

$$\frac{d\phi}{dt} = \frac{\Omega_o}{\gamma}(m+N)\left(1 - \frac{1 + \frac{K^2}{2}}{2\gamma^2}\right) - \omega. \quad (9b)$$

Notice that $k_l r \sim m$, therefore $J_m$ is near its maximum value. The same device without activating the wiggler field can be a gyrotron. The cyclotron velocity interacts with a TE mode given by $$E_\theta = EJ_m'(k_l r) \sin(m\theta - \omega t)$$

Where $J_m'$ is the derivative of the Bessel function of order m with respect to its argument.

such that $$m_e c^2 \frac{d\gamma}{dt} = \frac{er\Omega_o}{2\gamma} E J_m'(k_l r) \sin\phi, \quad (10a)$$

$$\frac{d\phi}{dt} = \frac{m\Omega_o}{\gamma} - \omega. \quad (10b)$$

A conventional free electron laser can be described by $$m_e c^2 \frac{d\gamma}{dt} = \frac{e\tilde{\Omega}_w}{2k_w\gamma} E_{rf} \sin\phi, \quad (11a)$$

$$\frac{d\phi}{dt} = (k_w + k)\left(1 - \frac{1 + \frac{K^2}{2}}{2\gamma^2}\right)c - \omega. \quad (11b)$$

The similarity of $\gamma$ dependence in Eqs. (9b) and (10b) indicates the favorable cyclotron maser effect for the coherent radiation source 20 of the present invention. Moreover, there exists an adiabatic invariant for each of the above three sets of equations. They are, however, too complicated for further analytical treatment.

By expanding $\gamma$ around the stationary phase (resonance) value, the three sets of equations are reduced to the nonlinear pendulum problem. For a conventional free electron laser:

$$\frac{d\eta}{dt} = \alpha_F \sin\phi, \quad (12a)$$

$$\frac{d\phi}{dt} = \eta, \quad (12b)$$

with the Hamiltonian $H_F = \eta^2 + 2\alpha_F \cos\Phi$ and $\alpha_F = (e\phi_{rf}/m_e c^2)(\tilde{\Omega}_w/2k_w c)$; for a conventional gyrotron $$\frac{d\eta}{dt} = \alpha_G \sin\phi, \quad (13a)$$

$$\frac{d\phi}{dt} = -\eta, \quad (13b)$$

with the Hamiltonian $H_G = \eta^2 - 2\alpha_G \cos\Phi$ and $\alpha_G = -(e\Phi/m_e c^2)[J_m'(Klr)/2\gamma_o]$; for the radiation source 20 of the present invention $$\frac{d\eta}{dt} = \alpha_{GF} \sin\phi, \quad (14a)$$

$$\frac{d\phi}{dt} = -\eta, \quad (14b)$$

with the Hamiltonian $H_{GF} = \eta^2 - 2\alpha_{GF} \cos\Phi$, and $\alpha_{GF} = (e\phi/m_e c^2)[\tilde{\Omega}_w J_m(K_l r)/\omega]$. It appears that since $\tilde{\Omega}_w < \Omega_o < \omega$, $\alpha_F > \alpha_G > \alpha_{GF}$ probably holds for most cases. The radiation source 20 has the same phase bunching effect as the gyrotron, and by adjusting $\alpha_{GF}$, one may have the efficiency in source 10 close to a gyrotron with higher frequency radiation. It is important to note that the TE modes must be addressed to eliminate the low frequency gyrotron radiation. The $j_e$ component can be damped through the use of a corrugated drift tube, or azimuthally distributed dielectric stripes (shields) can be employed.

Taking the axial magnetic field $B_o=10$ kG, $v_1 \sim c$, $\gamma \sim 2$, then the device has a radius $\rho_e = \gamma c/\Omega_o \sim 0.5$ cm, and the circumference is $2\pi\rho_e \sim 3$ cm. Taking $N \sim 2$, the generated wave frequency is $2\gamma N\Omega_o = 240$ GHz. Both the axial and wiggler magnetic fields can be constructed from normal conductors. This would be a regime to improve the present-day gyrotron for higher frequency wave generation. If superconducting magnets are used and one wishes to push to the very limit of the state-of-the-art, around $\frac{1}{4}$ mm diameter wires carrying 15 A current can be used. The wiggler magnetic field $B_w$ is 60b gauss at $\frac{1}{2}$ mm. The electric field as seen by an electron moving at speed of light would be $E\omega \sim 18$ keV/cm. Taking $B_o \sim 50$ kG, $\gamma \sim 10$, then $\rho_e \sim 0.4$ cm and the circumference $\sim 2\pi\rho_e \sim 2$ cm. With $\lambda\omega \sim 1$ mm, then $N \sim 10$ to 20 periods can be arranged. The emitted wave has wavelength $\lambda \sim \lambda_w/2\gamma 2 \sim 5 \times 10^{-4}$ cm (infrared). If $\gamma \sim 100$, then the device has a radius $\rho_e \sim 4$ cm, then $N \sim 10$ to 200, therefore $\lambda \sim 5 \times 10^{-6}$ cm (ultraviolet).

Referring again to FIG. 2, a first mirror 51 is positioned adjacent the input end 36 of the drift tube 34. The mirror has a central aperture 52 for passage of the beam of relativistic electrons. A second mirror 54 which is partially reflective is disposed in the tube 34 adjacent the output end 38. The coherent radiation source 20 is configured as an oscillator in that the mirrors 51 and 54 establish a resonant cavity. The acceleration of the spiraling electrons causes photon emission in the output direction of the drift tube. This light is reflected by the mirrors and results in stimulated emission of further radiation. After multiple passes, the coherent radiation has sufficient intensity that partially reflective output mirror 54 allows coherent radiation to escape.

Figure 3:
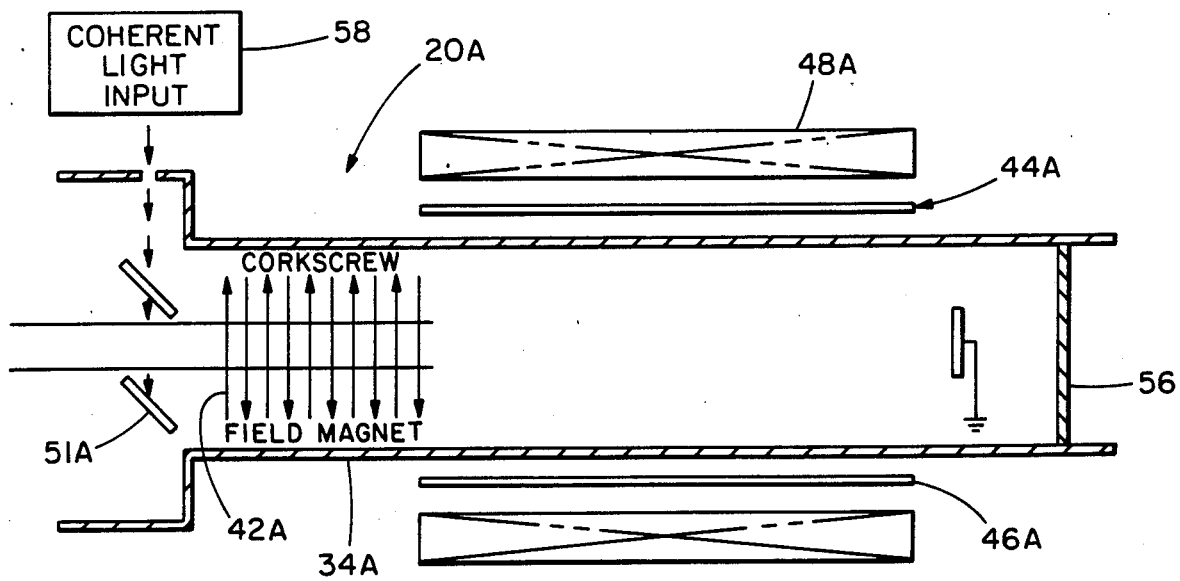
FIG. 3 is a partly diagrammatic axial sectional view of the coherent radiation source of the present invention configured as an amplifier.

An alternative preferred embodiment of a coherent radiation source of the present invention which is configured as an amplifier is shown in FIG. 3 at reference character 20A. Components of radiation source 20A corresponding to components of source 20 are indicated by the reference number assigned to the component of source 20, with the addition of the suffix "A". In the source 20A, the first mirror 51A is angled with respect to the axis of the drift tube 34A and a transparent window 56 replaces the partially reflective mirror at the output end 38A of the drift tube. The source 20A further includes an input signal generator 58 for providing and directing a coherent input signal to be amplified onto the mirror 51A. The mirror 51A is properly positioned to reflect this input signal into the drift tube where it interacts with the gyrating relativistic electrons to stimulate radiation emission at the same wavelength as the input signal thereby resulting in an amplified output of the coherent input light through the transparent window 56.

It will thus be apparent that the coherent radiation source 20, which could be termed a gyro free electron laser, takes advantage of the individual strengths of gyrotrons and free electron lasers while avoiding their individual shortcomings. Prior art gyrotrons can generate no shorter than microwave radiation but have demonstrated efficiencies above 30%. Additionally gyrotrons have passive mode selection. That is, the mode is determined by the parameters of the output cavity. On the other hand, prior art free electron lasers can generate radiation with wavelengths in the optical range but have very low efficiency. And they are tunable over a range by varying the beam energy or by varying the magnetic field strength.

The gyrotron operates on the principle of negative mass instability, which favors particles losing energy due to phase bunching by the relativistic mass variation. The conventional free electron laser operates on the principle of stimulated scattering, which generates a higher frequency outgoing wave by scattering an incoming wave off the relativistic electron beam. An incoming wave in the electron rest frame is provided by the wiggler. Therefore, unlike the conventional atomic laser, the free electron laser is freed from atomic structures, and has the potential of providing high power, continuously tunable, coherent radiation in the frequency range of microwave to ultraviolet. Applications of free electron lasers include those of conventional lasers such as communications, diagnostic, photochemistry (selective chemical reaction, isotope separation, integrated circuit technology), and medical research, etc.

Because an axial magnetic field in excess of 100 kG is impractical, the fundamental cyclotron wave generated from a gyrotron is limited to less than a couple of hundred gigahertz. This leads to the consideration of high harmonic gyrotron operating at frequency $\omega = N\Omega_o$. However, to achieve oscillation at modest N, higher current to compensate wall loss, and higher velocity to enhance wave particle interaction are necessary. Moreover, mode competition is expected to be more severe among the neighboring harmonics. The free electron laser, on the other hand, is capable of generating modes at shorter wavelength, $\lambda = \lambda_w/2\gamma^2$, where $\lambda_w$ is the periodic length of the wiggler, and $\lambda$ is the relativistic factor.

The coherent radiation source 20 of the present invention remedies the weaknesses of conventional gyrotrons and conventional free electron lasers. The field generated by the wiggler 44 is active in selecting the specific harmonic cyclotron wave in contrast to the passive selection in the conventional gyrotron. The output of the corkscrew magnet 42 resembles a large-orbit, low-B gyrotron and superimposed on it is the wiggler field, which has an equivalent frequency $\omega_i = k_i v = N\Omega_o/\gamma$. This wave is scattered off the relativistic electrons to give an outgoing wave at frequency $\omega_o = 2\gamma^2 \omega_i = 2\gamma N\Omega_o$. Active mode selection has better radiation quality in terms of mode bandwidth and sharpness. Since the mass variation of cyclotron frequency $\Omega = \Omega_o/\gamma$ favors particles losing energy, the coherent radiation source 20 has the same advantage of negative mass instability as in the gyrotron.

The high multipole wiggler 44 can be used despite the fact that its field decays very fast away from the wire because the axial magnetic field provided by the solenoid 48 controls the closeness to the multipole field by adjusting the gyroradii. An electron beam with relatively small $v_{90}$ (velocity in the axial direction of the drift tube) drifts along the tube forming a current sheet. This enhances the energy gain of the rf traveling across the device. The rf field is a TM mode in the cavity.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A source of coherent radiation in the infrared, visible light and ultraviolet frequency range comprising:
   an evacuated drift tube having an input end for receiving a beam of relativistic electrons and an output end for providing coherent radiation;
   electron supply means for providing a beam of relativistic electrons to the drift tube input end;
   magnetic field means for causing said relativistic electrons to spiral;
   azimuthal wiggler means for causing the spiraling electrons to undergo accelerations, said magnet field means also controlling the gyroradii of the spiraling electrons acted upon by said wiggler means.

2. A coherent radiation source as set forth in claim 1 wherein said wiggler means comprises an even-numbered plurality of regularly circumferentially spaced current rods disposed outside said drift tube and about its periphery, each rod extending substantially parallel to the axis of said tube with direct current in opposite directions in adjacent rods.

3. A coherent radiation source as set forth in claim 2 wherein said magnetic field means includes a corkscrew field means disposed adjacent said input end for causing said relativistic electrons to spiral, and further includes axial magnetic field means disposed between the corkscrew field means and said output end for controlling the gyroradii of the spiraling electrons.

4. A coherent radiation source as set forth in claim 3 wherein said axial magnetic field means comprises a solenoid winding disposed outside and wound coaxially with said drift tube, said rods being positioned between said solenoid and said drift tube.

5. A coherent radiation source as set forth in claim 1 further comprising a first mirror disposed adjacent the input end of said drift tube, and a second mirror positioned in said tube adjacent said output end and being partially reflective, said mirrors and said drift tube establishing a resonant cavity so that said source operates as an oscillator.

6. A coherent radiation source as set forth in claim 1 further comprising a mirror disposed adjacent the input end of said drift tube, and further comprising means for providing and directing a coherent input signal to be amplified on to said mirror, said mirror being positioned to reflect said input signal into said drift tube, said source further comprising a transparent window at the output end of said drift tube.

* * * * *

UNITED STATES PATENT AND TRADEMARK OFFICE
CERTIFICATE OF CORRECTION

PATENT NO. : 4,679,197

DATED : July 7, 1987

INVENTOR(S) : Jang-Yu Hsu

It is certified that error appears in the above-identified patent and that said Letters Patent is hereby corrected as shown below:

Face of patent, within the references, Subclass for "Madey et al., Pat. No. 4,283,687" should be --94.5--.

In the Abstract, line 3, change "bem" to --beam--.

Column 1, line 20, change "bremsstahlung" to --bremsstrahlung--.

Column 1, line 51, change "Hirchfield" to --Hirshfield--.

Column 1, lines 51-52, change "Mase-r" to --Maser--.

Column 1, lines 52-53, change "Microware" to --Microwave--.

Column 3, line 14, change "positioned" to --position--.

Column 4, line 42, change "cosNs" to $--\cos N\theta--$.

Column 4, line 59, change "$\vec{v}$" to $--\vec{v}--$.

Column 4, line 67, change "$\dot{\theta} = \omega_o/\gamma$, $v_\theta = r\omega_o/$" to $--\dot{\theta} = \Omega_o/\gamma$, $v_\theta = r\Omega_o/--$.

Column 5, line 13, change "$\omega_o \gg \omega_o$" to $--\Omega_o \gg \Omega_o--$.

UNITED STATES PATENT AND TRADEMARK OFFICE
CERTIFICATE OF CORRECTION

PATENT NO. : 4,679,197

DATED : July 7, 1987

INVENTOR(S) : Jang-Yu Hsu

Page 2 of 2

It is certified that error appears in the above-identified patent and that said Letters Patent is hereby corrected as shown below:

Column 5, line 19, change "$\omega_\omega(r)$" to --$\Omega_\omega(r)$--.

Column 5, line 23, change "$E_z$" to --$E_2$--.

Column 5, line 23, change "$(k_j r)$" to --$(k_1 r)$--.

Column 5, line 24, change "$\Omega_2$" to --$\omega_2$--.

Column 5, line 30, change "$\Omega$" to --$\omega$--.

Column 5, line 35, change "$>=$" to --$\geq$--.

Column 5, line 44, change "$\pi c/r$" to --$mc/r$--.

Column 5, line 66, before "Where" insert --(--.

Column 5, line 68, after "argument." insert --)--.

Column 6, line 38, change "$2a_F$" to --$2\alpha_F$--.

Column 6, line 48, change "$(k1r)$" to --$(k_1 r)$--.

Column 6, line 64, change "addressed" to --suppressed--.

Column 8, line 57, change "$V_{90}$" to --$V_\pi$--.

Signed and Sealed this

Twenty-fourth Day of November, 1987

*Attest:*

DONALD J. QUIGG

*Attesting Officer*     *Commissioner of Patents and Trademarks*